US012499838B2

(12) United States Patent
Yang et al.

(10) Patent No.: US 12,499,838 B2
(45) Date of Patent: Dec. 16, 2025

(54) PIXEL, METHOD OF DRIVING PIXEL, AND DISPLAY DEVICE INCLUDING PIXEL

(71) Applicants: LG Display Co., Ltd., Seoul (KR); SNU R&DB FOUNDATION, Seoul (KR)

(72) Inventors: Jungyul Yang, Paju-si (KR); Jihwan Park, Seoul (KR); Sooyeon Lee, Seoul (KR)

(73) Assignees: LG Display Co., Ltd., Seoul (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 18/782,833

(22) Filed: Jul. 24, 2024

(65) Prior Publication Data

US 2025/0209987 A1 Jun. 26, 2025

(30) Foreign Application Priority Data

Dec. 20, 2023 (KR) ........................ 10-2023-0186480

(51) Int. Cl.
*G09G 3/3241* (2016.01)

(52) U.S. Cl.
CPC ... *G09G 3/3241* (2013.01); *G09G 2300/0852* (2013.01); *G09G 2300/0861* (2013.01); *G09G 2310/0262* (2013.01); *G09G 2310/08* (2013.01)

(58) Field of Classification Search
CPC ......... G09G 3/3241; G09G 2300/0852; G09G 2300/0861; G09G 2310/0262; G09G 2310/08
See application file for complete search history.

(56) References Cited

U.S. PATENT DOCUMENTS 8,749,454 B2 6/2014 Ono
8,823,693 B2 9/2014 Ono
(Continued)

FOREIGN PATENT DOCUMENTS

JP 2006-301159 A 11/2006
JP 2007-121889 A 5/2007
(Continued)

OTHER PUBLICATIONS

Japan Patent Office, Office Action, Japanese Patent Application No. 2024-163205, May 20, 2025, eight pages.

*Primary Examiner* — Temesghen Ghebretinsae
*Assistant Examiner* — Karin Kiyabu
(74) *Attorney, Agent, or Firm* — Fenwick & West LLP

(57) ABSTRACT

A pixel comprises a driving transistor having a gate electrode at a first node, a first electrode connected to a high potential driving voltage, a second electrode connected to the light emitting element, and the driving transistor controlling the amount of driving current supplied to the light emitting element; a first transistor configured to transmit a reference voltage to the gate electrode of the driving transistor in response to a first gate signal; a second transistor configured to transmit a data voltage to the gate electrode of the driving transistor in response to a second gate signal; a third transistor electrically connecting the gate electrode of the driving transistor to the second electrode of the driving transistor in response to the first gate signal; and a fourth transistor electrically connecting the driving transistor with the light emitting element in response to an emission signal.

21 Claims, 7 Drawing Sheets

(56) References Cited

U.S. PATENT DOCUMENTS

| | | | |
|---|---|---|---|
| 9,165,503 B2 | 10/2015 | Shih et al. | |
| 10,297,205 B2 | 5/2019 | Hwang et al. | |
| 10,783,830 B1 | 9/2020 | Lu et al. | |
| 2006/0231740 A1 | 10/2006 | Kasai | |
| 2009/0027312 A1 | 1/2009 | Han et al. | |
| 2011/0164025 A1 | 7/2011 | Saito et al. | |
| 2011/0193855 A1 | 8/2011 | Han | |
| 2013/0092930 A1 | 4/2013 | Kimura | |
| 2014/0035799 A1 | 2/2014 | Bae et al. | |
| 2015/0130779 A1 | 5/2015 | Chang et al. | |
| 2015/0187818 A1 | 7/2015 | Miyake et al. | |
| 2016/0203794 A1* | 7/2016 | Lim | G09G 3/3225 345/77 |
| 2017/0221422 A1 | 8/2017 | Hwang et al. | |
| 2021/0142735 A1* | 5/2021 | Cho | G09G 3/3233 |
| 2022/0415254 A1* | 12/2022 | Jeon | G09G 3/3233 |

FOREIGN PATENT DOCUMENTS

| | | | |
|---|---|---|---|
| JP | WO2011/070615 A1 | | 4/2013 |
| JP | 2013-137509 A | | 7/2013 |
| JP | 2015-188059 A | | 10/2015 |
| KR | 20120052638 A | * | 5/2012 |
| KR | 10-2017-0092746 A | | 8/2017 |
| KR | 10-2020-0030415 A | | 3/2020 |

* cited by examiner

PIXEL, METHOD OF DRIVING PIXEL, AND DISPLAY DEVICE INCLUDING PIXEL

CROSS REFERENCE TO RELATED APPLICATION

The present application claims priority to Republic of Korea Patent Application No. 10-2023-0186480, filed Dec. 20, 2023, which is hereby incorporated by reference in its entirety.

BACKGROUND

Field of Technology

The present disclosure relates to a pixel, a method of driving the pixel, and a display device including the pixel.

Description of the Related Art

Recently, in display devices, a technology of driving pixels at low speeds to reduce consumed power when there is little change in input image has been developed.

When a display panel is driven at a low speed for a long time, a voltage at a specific node in a gate driver may be increased by current leakage and noise during a skip period. Such an increase in node voltage may reduce a driving force of the gate driver and cause poor image quality.

SUMMARY

Embodiments are directed to providing a pixel in which the number of switching transistors connected to a driving transistor is reduced, a method of driving the pixel, and a display device including the pixel.

In addition, the embodiments are directed to providing a pixel in which the number of emission signals required for driving the pixel is reduced by removing a switching transistor, a method of driving the pixel, and a display device including the pixel.

In one embodiment, a pixel comprises: a light emitting element; a driving transistor having a gate electrode at a first node, a first electrode that is connected to a first power line that supplies a high potential driving voltage to the first electrode of the driving transistor, and a second electrode electrically connected to the light emitting element at a second node, the driving transistor configured to control an amount of driving current supplied to the light emitting element in response to a voltage of the gate electrode; a first transistor configured to transmit a reference voltage to the gate electrode of the driving transistor in response to a first gate signal; a second transistor configured to transmit a data voltage to the gate electrode of the driving transistor in response to a second gate signal that is different from the first gate signal; a third transistor electrically connecting the gate electrode of the driving transistor to the second electrode of the driving transistor in response to the first gate signal; and a fourth transistor electrically connecting the driving transistor with the light emitting element in response to an emission signal.

In one embodiment, a method of driving a pixel including a light emitting element, a driving transistor having a gate electrode at a first node, a first electrode connected to a high potential voltage line that supplies a high potential driving voltage to the first electrode, and a second electrode connected to a second node, a first transistor connected to the gate electrode of the driving transistor at the first node and a reference voltage line that supplies a reference voltage to the first transistor and the first transistor having a gate electrode receiving a first gate signal, a second transistor connected to a data line that supplies a data voltage to the second transistor and a third node and having a gate electrode receiving a second gate signal, a third transistor connected between the third node and the second node and having a gate electrode receiving the first gate signal, a fourth transistor connected between the third node and the light emitting element and having a gate electrode receiving an emission signal, and a first capacitor connected between the first node and the third node, the method comprising: applying the first gate signal and the emission signal at turn-on levels during an initializing period, the first transistor and the third transistor turned on during the initializing period responsive to the first gate signal and the fourth transistor turned on during the initializing period responsive to the emission signal; applying the first gate signal at a turn-on level during a sensing period that is after the initializing period, the first transistor and the third transistor turning on during the sensing period responsive to the first gate signal; applying the second gate signal at a turn-on level during a programming period that is after the sensing period, the second transistor turning on during the programming period responsive to the second gate signal; and applying the emission signal at a turn-on level during an emission period that is after the programming period, the fourth transistor turned on during the emission period responsive to the emission signal.

In one embodiment, a pixel comprises: a light emitting element; a driving transistor including a first electrode connected to a high potential voltage line that supplies a high potential voltage to the driving transistor, a second electrode connected to a second node, and a gate electrode connected to a first node; a first transistor including a first electrode connected to a reference line that supplies a reference voltage to the first transistor, a second electrode connected to the gate electrode of the driving transistor at the first node, and a gate electrode that receives a first gate signal; a second transistor including a first electrode connected to a data line that supplies a data voltage to the second transistor, a second electrode connected to a third node, and a gate electrode that receives a second gate signal that is different from the first gate signal; a third transistor including a first electrode connected to the second electrode of the second transistor at the third node, a second electrode connected to the second electrode of the driving transistor at the second node, and a gate electrode that receives the first gate signal; a fourth transistor including a first electrode connected to the second electrode of the driving transistor and the second electrode of the third transistor at the second node, a second electrode connected to the light emitting element, and a gate electrode that receives an emission signal; and a first capacitor including a first capacitor electrode connected to the second electrode of the first transistor and the gate electrode of the driving transistor at the first node and a second capacitor electrode connected to second electrode of the second transistor and the first electrode of the third transistor at the third node.

DETAILED DESCRIPTION

Figure 1:
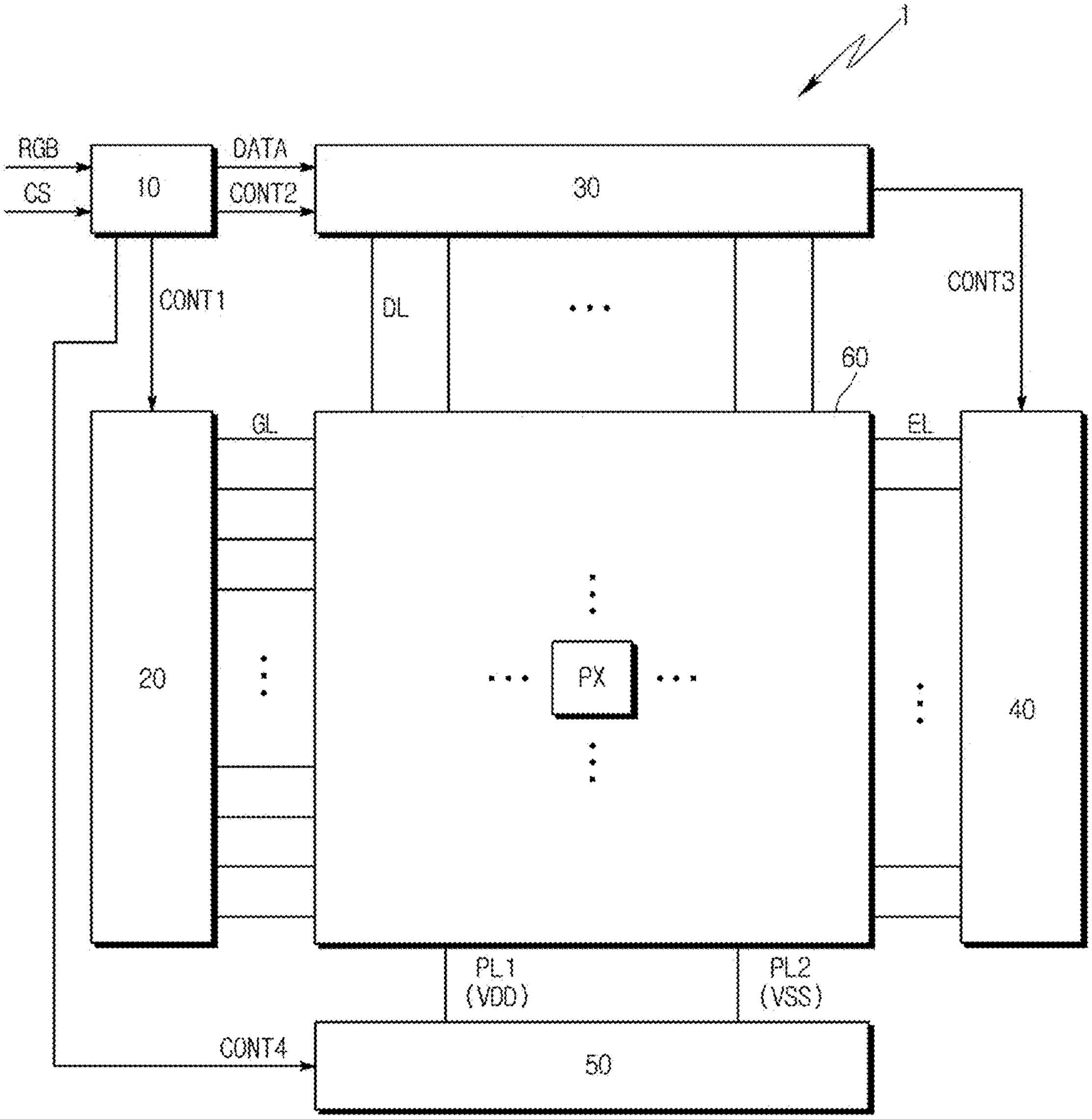
FIG. 1 is a block diagram showing a configuration of a display device according to one embodiment.

Hereinafter, embodiments will be described with reference to the accompanying drawings. In the specification, when a first component (or an area, a layer, a portion, or the like) is described as "on," "connected," or "coupled to" a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term "and/or" includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the embodiments. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

FIG. 1 is a block diagram schematically showing a structure of a display device according to one embodiment.

Referring to FIG. 1, a display device 1 includes a timing controller 10, a gate driver 20, a data driver 30, an emission driver 40, a power supply unit 50, and a display panel 60.

The timing controller 10 (e.g., a timing controller circuit) may receive image signals RGB and a control signal CS from an external host system or the like. The image signals RGB may include a plurality of grayscale data. The control signal CS may include, for example, a horizontal synchronization signal, a vertical synchronization signal, a main clock signal, and the like.

The timing controller 10 may process the image signals RGB and the control signal CS according to operating conditions of the display panel 60, and generate and output image data DATA, a gate driving control signal CONT1, a data driving control signal CONT2, an emission driving control signal CONT3, and a power supply control signal CONT4. The timing controller 10 may control operation timings of the gate driver 20, the data driver 30, and the emission driver 40 through the control signals.

The gate driver 20 (e.g., a gate driver circuit) may generate gate signals based on a gate driving control signal CONT1 output from the timing controller 10. The gate driver 20 may provide the generated gate signals to pixels PX through a plurality of gate lines GL. In one embodiment, the gate driver 20 may generate one or more gate signals having turn-on levels at different timings.

The data driver 30 (e.g., a data driver circuit) may generate data signals based on the image data DATA and the data driving control signal CONT2 that are output from the timing controller 10. The data driver 30 may provide the generated data signals to the pixels PX through a plurality of data lines DL.

The emission driver 40 (e.g., an emission driver circuit) may generate emission control signals based on the emission driving control signal CONT3 output from the timing controller 10. The emission driver 40 may provide the generated emission control signals to the pixels PX through a plurality of emission lines EL.

The power supply unit 50 (e.g., a power supply circuit) may generate a high potential driving voltage VDD and a low potential driving voltage VSS to be provided to the display panel 60 based on the power supply control signal CONT4. The power supply unit 50 may provide the generated driving voltages VDD and VSS to the pixels PX through the corresponding power lines PL1 and PL2.

A plurality of pixels PX (or referred to as sub-pixels) are disposed at the display panel 60. The pixels PX may include one or more transistors and a light emitting element connected to the gate line GL and the data line DL. The pixels PX charge a data voltage supplied through the data line DL in response to the gate signal applied through the gate line GL and emits light with a luminance corresponding to the charged data voltage in response to an emission control signal applied through an emission line EL.

In one embodiment, each pixel PX may display one of red, green, and blue. In another embodiment, each pixel PX may display one of cyan, magenta, and yellow. In various embodiments, each pixel PX may display one of red, green, blue, and white.

The timing controller 10, the gate driver 20, the data driver 30, the emission driver 40, and the power supply unit 50 may each be configured as a separate integrated circuit (IC) or at least a partially integrated IC. In addition, the gate driver 20 and the emission driver 40 may be configured in a gate in panel type formed integrally with the display panel 60. In the present embodiment, the gate driver 20 and the emission driver 40 may constitute a gate-in-panel (hereinafter referred to as "GIP").

Figure 2:
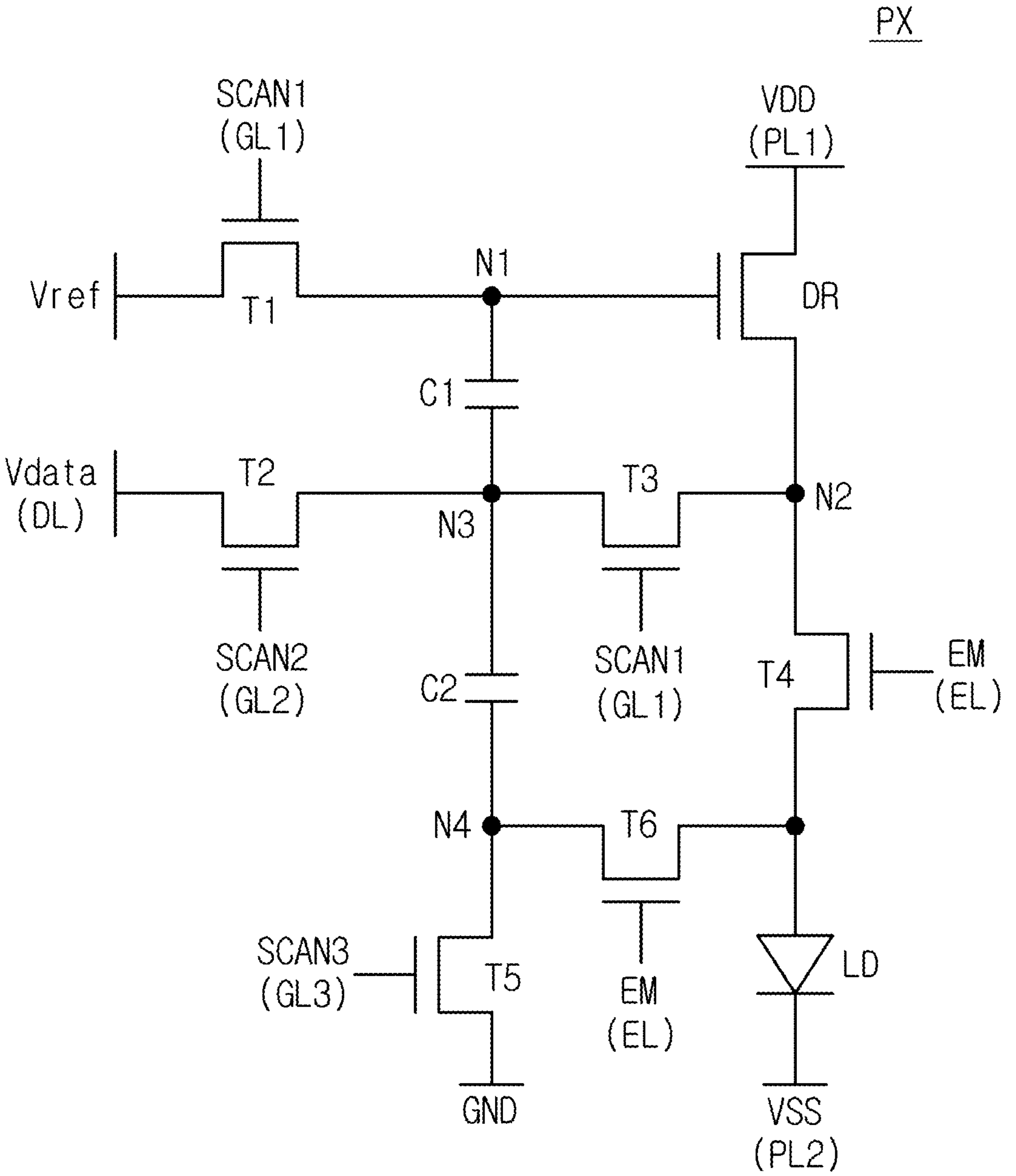
FIG. 2 is a circuit diagram of the pixel according to one embodiment.

FIG. 2 is a circuit diagram of the pixel according to one embodiment.

Referring to FIG. 2, the pixel PX according to one embodiment may include a driving transistor DR, a light emitting element LD connected to the driving transistor DR, and a control circuit for controlling the amount of driving current to be applied to the light emitting element LD through the driving transistor DR. For example, the control circuit may include first to sixth transistors T1 to T6 and first and second capacitors C1 and C2.

A first electrode (e.g., a drain electrode) of the driving transistor DR is configured to receive the high potential driving voltage VDD via a high potential driving power line PL1 that is connected to the first electrode, and a second electrode (e.g., a source electrode) is electrically connected to the light emitting element LD at a second node N2. A gate electrode of the driving transistor DR is connected to a first node N1. The driving transistor DR may be turned on according to a voltage applied to the first node N1 to control the amount of driving current flowing to the light emitting device LD.

A first electrode (e.g., a drain electrode) of the first transistor T1 is configured to receive a reference voltage Vref from a reference voltage line, and a second electrode (e.g., a source electrode) thereof is connected to the gate electrode of the driving transistor DR at the first node N1. A gate electrode of the first transistor T1 may be connected to a first gate line GL1 to receive a first gate signal SCAN1 from the first gate line GL1. The first transistor T1 may be turned on according to the first gate signal SCAN1 applied to the first gate line GL1 to transmit the reference voltage Vref to the gate electrode of the driving transistor DR at the first node N1. The first transistor T1 may be referred to as "first switching transistor."

The first electrode (e.g., a drain electrode) of the second transistor T2 is connected to the data line DL, and a second electrode (e.g., a source electrode) of the second transistor T2 is electrically connected to the gate electrode of the driving transistor DR at a third node N3. A gate electrode of the second transistor T2 may be connected to a second gate line GL2 and receives a second gate signal SCAN2 from the second gate line GL2. The second transistor T2 may be turned on according to the second gate signal SCAN2 applied to the second gate line GL2 and may transmit the data voltage Vdata applied to the data line DL to the gate electrode of the driving transistor DR. The second transistor T2 may be referred to as "second switching transistor."

A first capacitor C1 may be connected between the second electrode of the second transistor T2 at the third node N3 and the gate electrode of the driving transistor DR at the first node N1. That is, a first capacitor electrode of the first capacitor C1 is connected to the first node N1 and a second capacitor electrode of the first capacitor C1 is connected to the third node N3. The first capacitor C1 may store a voltage corresponding to a voltage difference between the first node N1 and the third node N3.

The third transistor T3 is connected between the second node N2 and the third node N3. A first electrode (e.g., a drain electrode) of the third transistor T3 is connected to the second electrode of the second transistor T2 and the second electrode of the first capacitor C1 at the third node N3 and a second electrode (e.g., a source electrode) of the third transistor T3 is connected to the second electrode of the driving transistor DR at the second node N2. A gate electrode of the third transistor T3 may be connected to the first gate line GL1 and receives the first gate signal SCAN1 from the first gate line GL1. The third transistor T3 may be turned on according to the first gate signal SCAN1 applied to the first gate line GL1 to electrically connect the gate electrode (third node N3) of the driving transistor DR with the second electrode (second node N2). The third transistor T3 may be referred to as "third switching transistor."

A first electrode (e.g., a drain electrode) of the fourth transistor T4 is connected to the driving transistor DR and the second electrode of the third transistor T3 at the second node N2, and a second electrode (e.g., a source electrode) of the fourth transistor T4 is connected to an anode electrode of the light emitting element LD. A gate electrode of the fourth transistor T4 may be connected to the emission line EL to receive the emission signal EM. The fourth transistor T4 may be turned on according to the emission signal EM applied to the emission line EL to electrically connect the driving transistor DR with the light emitting element LD (fourth node N4). The fourth transistor T4 may be referred to as "light emitting transistor."

A first electrode (e.g., a drain electrode) of the fifth transistor T5 is connected to the fourth node N4, and a second electrode (e.g., a source electrode) of the fifth transistor T5 is connected to a power line supplying a base voltage GND. A gate electrode of the fifth transistor T5 may be connected to a third gate line GL3 and receives a third gate signal SCAN3 via the third gate line GL3. The fifth transistor T5 may be turned on according to the third gate signal SCAN3 applied to the third gate line GL3 to connect the fourth node N4 to the base voltage GND. The fifth transistor may be referred to as "fourth switching transistor."

The second capacitor C2 may be connected between the first electrode of the fifth transistor T5 and the fourth node N4. That is, the second capacitor C2 includes a first capacitor electrode connected to the second electrode of the second transistor T2 and the first electrode of the third transistor T3 at the third node N3 and a second capacitor electrode connected to the first electrode of the fifth transistor T5 at the fourth node N4. The second capacitor C2 may store a voltage corresponding to a voltage difference between the third node N3 and the fourth node N4.

A first electrode (e.g., a drain electrode) of the sixth transistor T6 is connected to the second electrode of the second capacitor C2 and the first electrode of the fifth transistor T5 at the fourth node N4, and a second electrode of the sixth transistor T6 is connected to the anode electrode of the light emitting element LD and the second electrode of the fourth transistor T4. A gate electrode of the sixth transistor T6 may be connected to the emission line EL to receive the emission signal EM. The sixth transistor T6 may be turned on according to the emission signal EM applied to the emission line EL to connect the fourth node N4 with the anode electrode of the light emitting element LD. The sixth transistor T6 may be referred to as "fifth switching transistor."

The anode electrode of the light emitting element LD may be connected to the fourth transistor T4, and a cathode electrode thereof may be connected to the low potential driving voltage VSS. When the driving transistor DR and the fourth transistor T4 are turned on, a current path may be formed between the high potential driving voltage VDD and the low potential driving voltage VSS to allow the driving current to flow to the light emitting element LD. The light emitting element LD may emit light with luminance corresponding to the amount of driving current applied.

In the embodiment shown in FIG. 2, the pixel PX may be formed of oxide semiconductor thin film transistors.

The oxide semiconductor thin film transistor includes a gate electrode, a source electrode, and a drain electrode. The oxide semiconductor thin film transistor has an active layer formed of an oxide semiconductor. Here, the oxide semiconductor may be set to an amorphous or crystalline oxide semiconductor. The oxide semiconductor thin film transistor may be formed as an n-type transistor. The oxide semiconductor thin film transistor may be processed at low temperatures and has lower charge mobility than a low temperature poly-silicon (LTPS) thin film transistor. The oxide semiconductor thin film transistor has excellent off-current characteristics.

However, the present embodiment is not limited thereto. In another embodiment, at least one of the transistors DR and T1 to T6 may be formed as an oxide semiconductor thin film transistor.

The LTPS thin film transistor includes a gate electrode, a source electrode, and a drain electrode. The LTPS thin film transistor has an active layer made of polysilicon. The LTPS thin film transistor may be formed as a p-type thin film transistor or an n-type thin film transistor. The LTPS thin film transistor has high electron mobility, and thus has fast driving characteristics.

Figure 3:
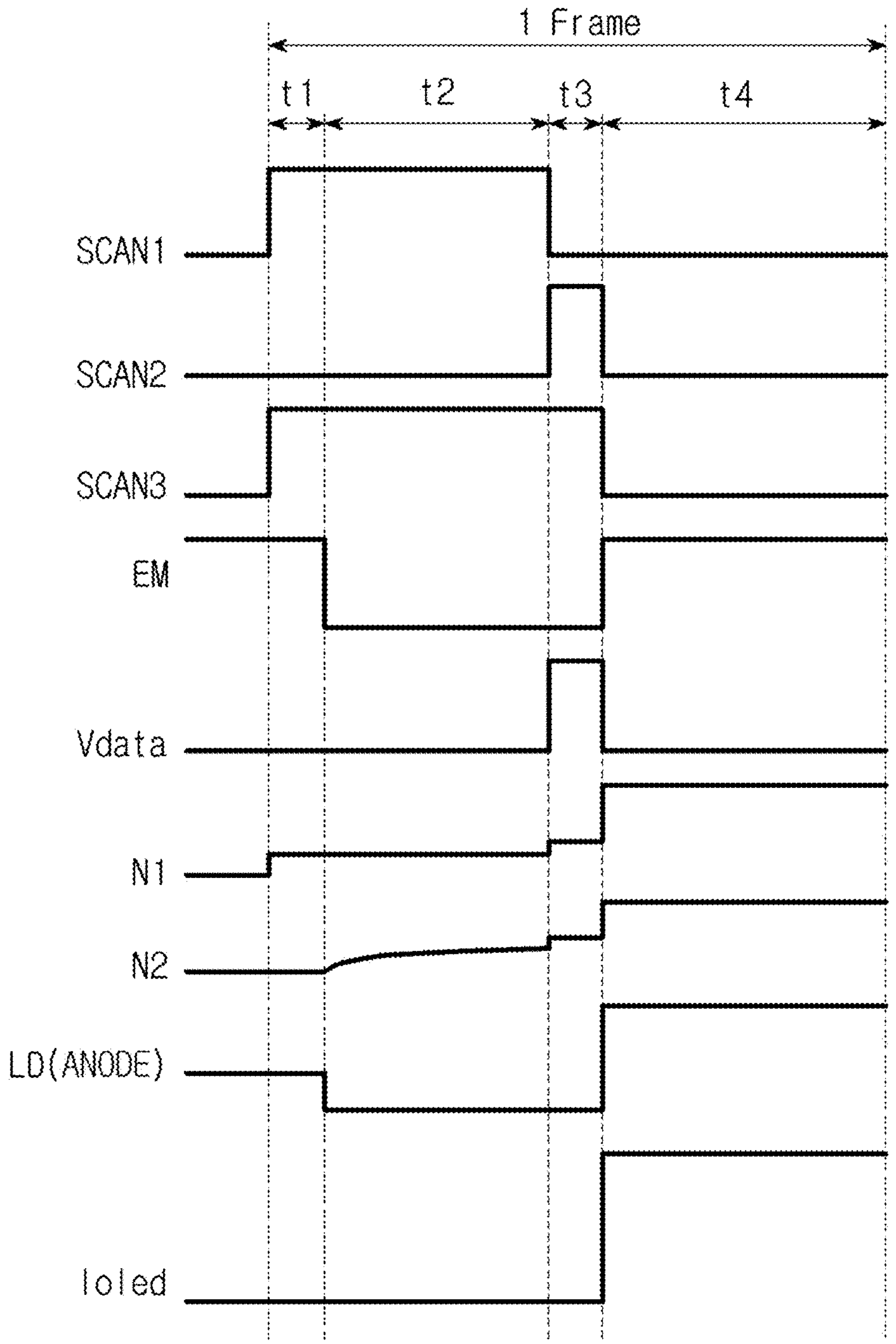
FIG. 3 is a waveform diagram describing changes in signals applied to the pixel shown in FIG. 2 and node voltage and driving current according to one embodiment.

FIG. 3 is a waveform diagram for describing changes in signals applied to the pixel shown in FIG. 2 and node voltage and driving current according to one embodiment. FIGS. 4 to 7 are views for describing a method of driving the pixel shown in FIG. 2 according to one embodiment.

Referring to FIG. 3, in the driving method according to one embodiment, one frame may include an initialization period t1 (initializing operation), a sensing period t2 (sensing operation), a programming period t3 (programming operation), and an emission period t4 (emitting operation).

Figure 4:
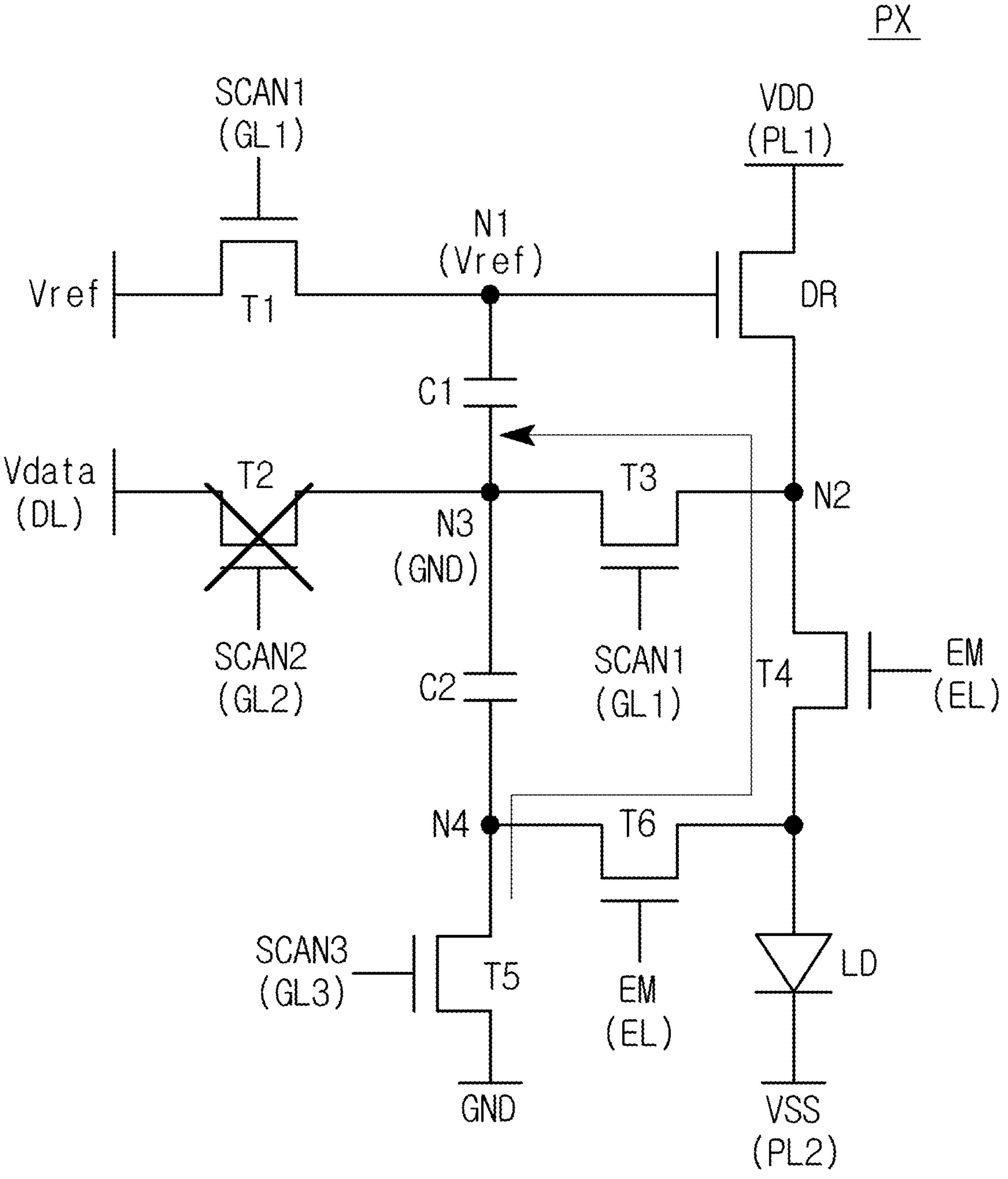
FIGS. 4, 5, 6, and 7 are views for describing a method of driving the pixel shown in FIG. 2 according to one embodiment.

During the initialization period t1, a voltage at each node of the pixel PX may be initialized to a predetermined voltage. Referring to FIGS. 3 and 4 together, during the initialization period t1, the first gate signal SCAN1, the third gate signal SCAN3, and the emission signal EM are applied at the turn-on level. Therefore, the first transistor T1, the third transistor T3, the fourth transistor T4, the fifth transistor T5, and the sixth transistor T6 are turned on.

As the first transistor T1 is turned on, the reference voltage Vref is applied to the first node N1. Therefore, the voltage at the first node N1, that is, of the gate electrode of the driving transistor DR may be initialized to the reference voltage Vref.

As the fourth to sixth transistors T4 to T6 are turned on, the base voltage GND is connected to the second node N2 via the fifth transistor T5, the sixth transistor T6, and the fourth transistor T4. Therefore, the voltage of the source electrode of the driving transistor DR and the anode electrode of the light emitting element LD are initialized to the base voltage GND.

As the third transistor T3 is turned on, the base voltage GND is further transmitted to the third node N3. Therefore, the first capacitor C1 stores the voltage corresponding to the voltage difference between the first node N1 and the third node N3, that is, the reference voltage Vref, and the second capacitor C2 stores the voltage corresponding to the voltage difference between the third node N3 and the fourth node N4, that is, 0 V.

Meanwhile, the reference voltage Vref may be set to a voltage higher than the threshold voltage Vth of the driving transistor DR. The reference voltage Vref may be set to, for example, about 2 V, but is not limited thereto. In this case, a gate-source voltage Vgs of the driving transistor DR may be set to the reference voltage Vref higher than the threshold voltage Vth of the driving transistor DR to turn on the driving transistor DR.

During the sensing period t2, the characteristic values of the driving transistor DR may be sensed. The characteristic value may be, for example, the threshold voltage Vth of the driving transistor DR.

Figure 5:
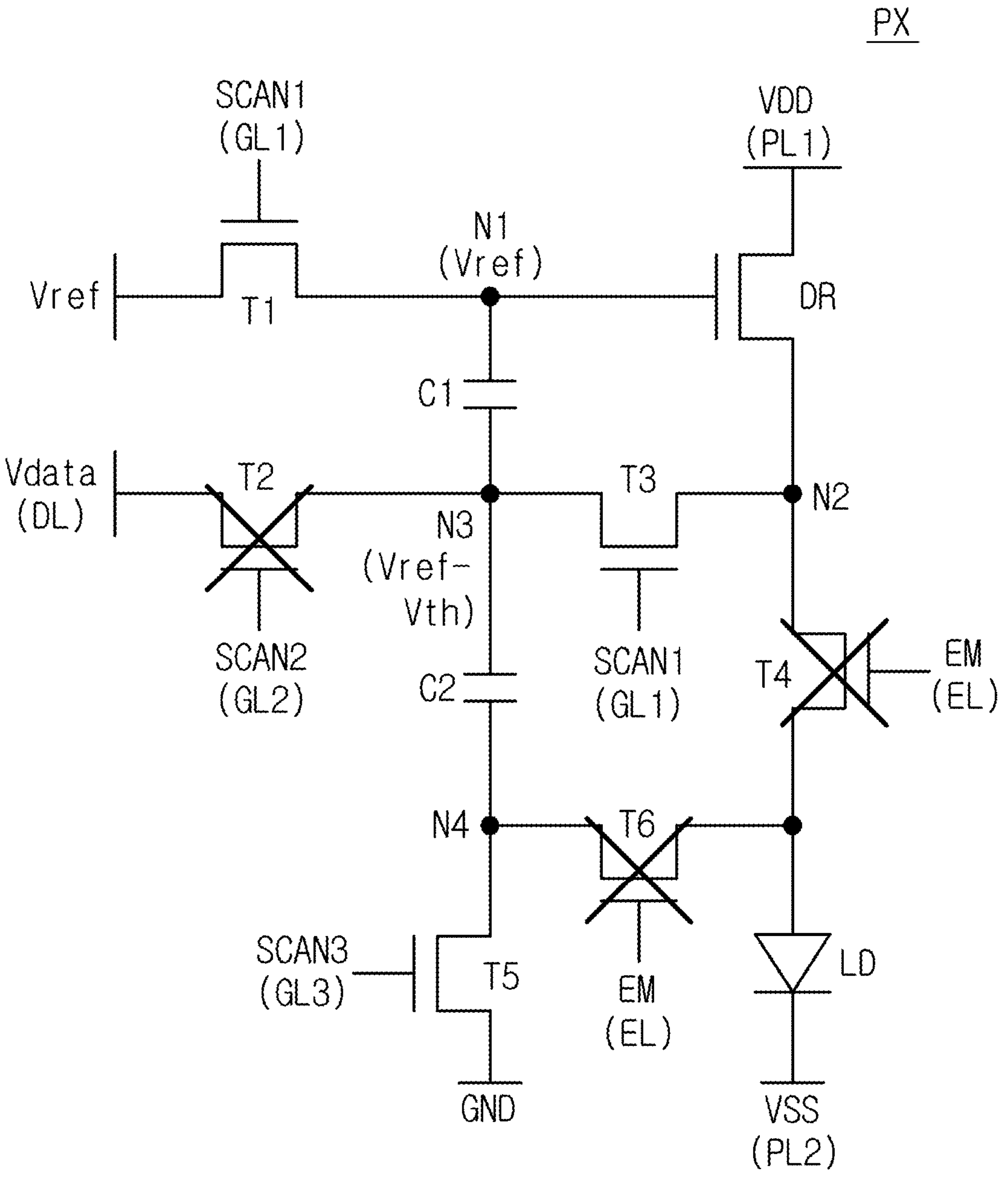

Referring to FIGS. 3 and 5 together, during the initialization period t2, the first gate signal SCAN1 and the third gate signal SCAN3 are applied at the turn-on level. Therefore, the first transistor T1, the third transistor T3, and the fifth transistor T5 are turned on.

As the first transistor T1 is turned on, the voltage at the first node N1 is maintained as the reference voltage Vref, and as the fifth transistor T5 is turned on, the voltage at the fourth node N4 is maintained as the base voltage GND. In addition, as the third transistor T3 is turned on, the second node N2 and the third node N3 are connected.

During the sensing period t2, a current may flow through the driving transistor DR in the turned-on state. A drain-source current of the driving transistor DR may be determined according to the reference voltage Vref and the threshold voltage Vth of the driving transistor DR.

The driving transistor DR may supply the source-drain current to the second node N2 until the gate-source voltage Vgs reaches the threshold voltage (i.e., when "reference voltage Vref-voltage at the second node N2=threshold voltage Vth" is satisfied). In addition, the third transistor T3 may supply the voltage at the second node N2 to the third node N3.

In such a manner, while the driving transistor DR is turned on, the voltage at the second node N2 and the source-drain current of the driving transistor DR may be gradually changed, and the voltage at the second node N2 and the voltage at the third node N3 may eventually converge to a voltage corresponding to a voltage difference between the reference voltage Vref and the threshold voltage Vth of the driving transistor DR.

The first capacitor C1 stores the voltage corresponding to the voltage difference between the first node N1 and the third node N3, that is, the threshold voltage Vth of the driving transistor DR, and the second capacitor C2 stores the voltage corresponding to the voltage difference between the third node N3 and the fourth node N4, that is, a voltage corresponding to the voltage difference between the reference voltage Vref and the threshold voltage Vth of the driving transistor DR.

Meanwhile, during the sensing period t2, the emission signal EM may be applied to the turn-off level to turn off the fourth transistor T4 and the sixth transistor T6. Therefore, during the sensing operation, the light emitting element LD may be separated from the sensing circuit, thereby preventing the abnormal light emission of the light emitting element LD.

Figure 6:
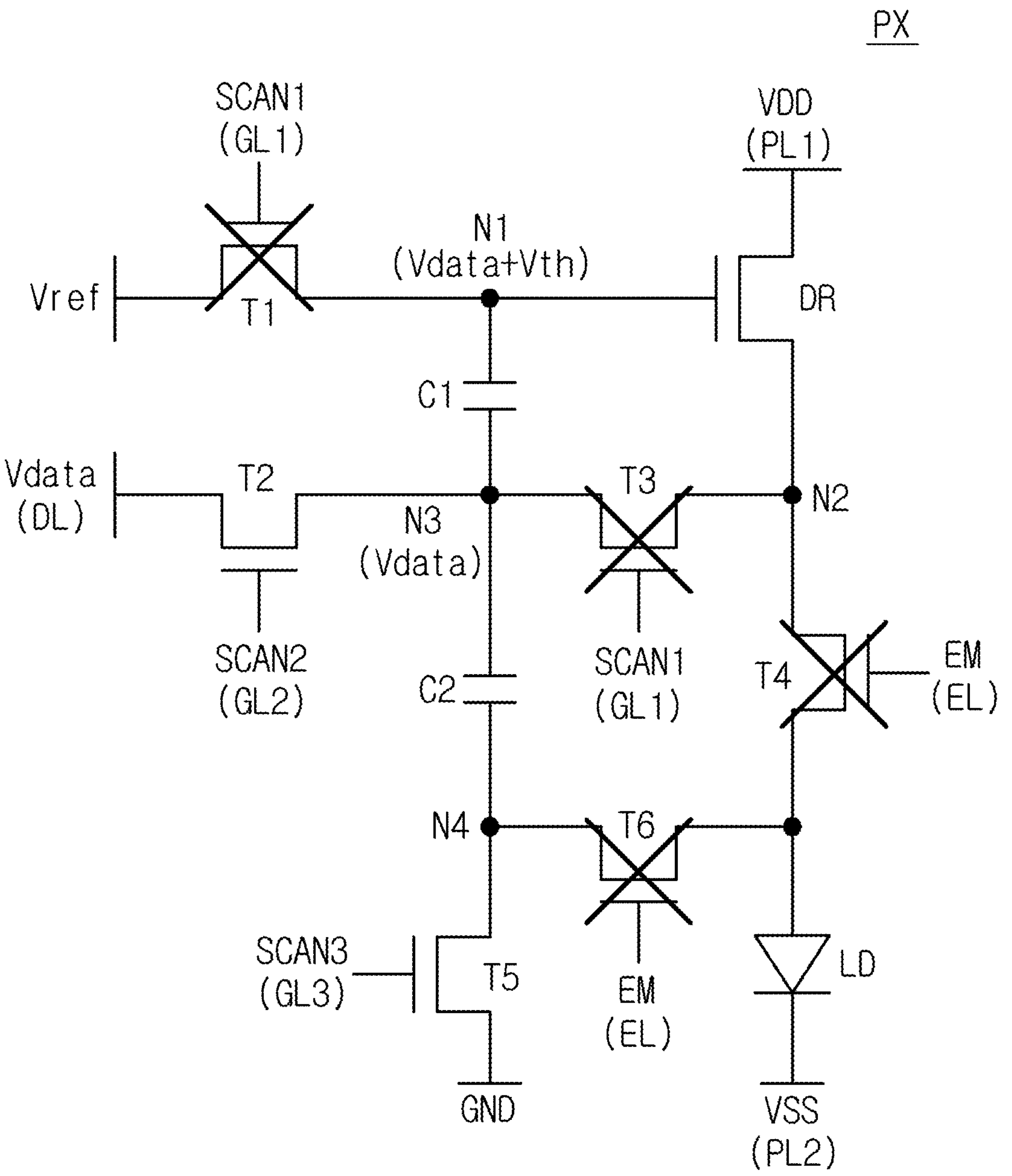

During the programming period t3, the data voltage Vdata may be programmed to the pixel PX. Referring to FIGS. 3 and 6 together, during the programming period t3, the second gate signal SCAN2 and the third gate signal SCAN3 are applied at the turn-on level. Therefore, the second transistor T2 and the fifth transistor T5 are turned on. Meanwhile, during the programming period t3, the data voltage Vdata is applied to the data line DL.

As the second transistor T2 is turned on, the data voltage Vdata applied to the data line DL is transmitted to the third node N3. In addition, as the fifth transistor T5 is turned on, the voltage at the fourth node N4 is maintained as the base voltage GND.

During the previous period, as the threshold voltage Vth of the driving transistor DR is charged in the first capacitor C1, the voltage at the first node N1 during the programming period t3 is set to the sum of voltages of the data voltage Vdata and the threshold voltage Vth of the driving transistor DR. The second capacitor C2 may store the voltage corresponding to the voltage difference between the third node N3 and the fourth node N4 which is the data voltage Vdata.

During the programming period t3, the third transistor T3 is turned off to separate the second node N2 and the third node N3, thereby preventing the influence of the mutual voltage variation of the second node N2 and the third node N3. That is, the source electrode of the driving transistor DR is in a floating state. Therefore, it is possible to prevent or at least reduce the voltage variation of the source electrode of the driving transistor DR due to the data voltage Vdata applied to the third node N3 and prevent the level variation of the data voltage Vdata applied to the third node N3 due to the voltage of the source electrode of the driving transistor DR.

In addition, the second transistor T2 is configured to transmit the data voltage Vdata to the gate electrode of the driving transistor DR through the first capacitor C1. That is, the gate electrode of the driving transistor DR is not directly connected to the second transistor T2 and is configured to receive the data voltage Vdata via the first capacitor C1. Therefore, it is possible to prevent or at least reduce voltage loss that may occur at the gate electrode of the driving transistor DR due to the switching operation of the second transistor T2.

Meanwhile, even during the programming period t3, the emission signal EM is applied at the turn-off level to turn off the fourth transistor T4 and the sixth transistor T6. Therefore, during the programming period t3, it is possible to prevent the abnormal light emission of the light emitting element LD despite the voltage variation of the second node N2.

Figure 7:
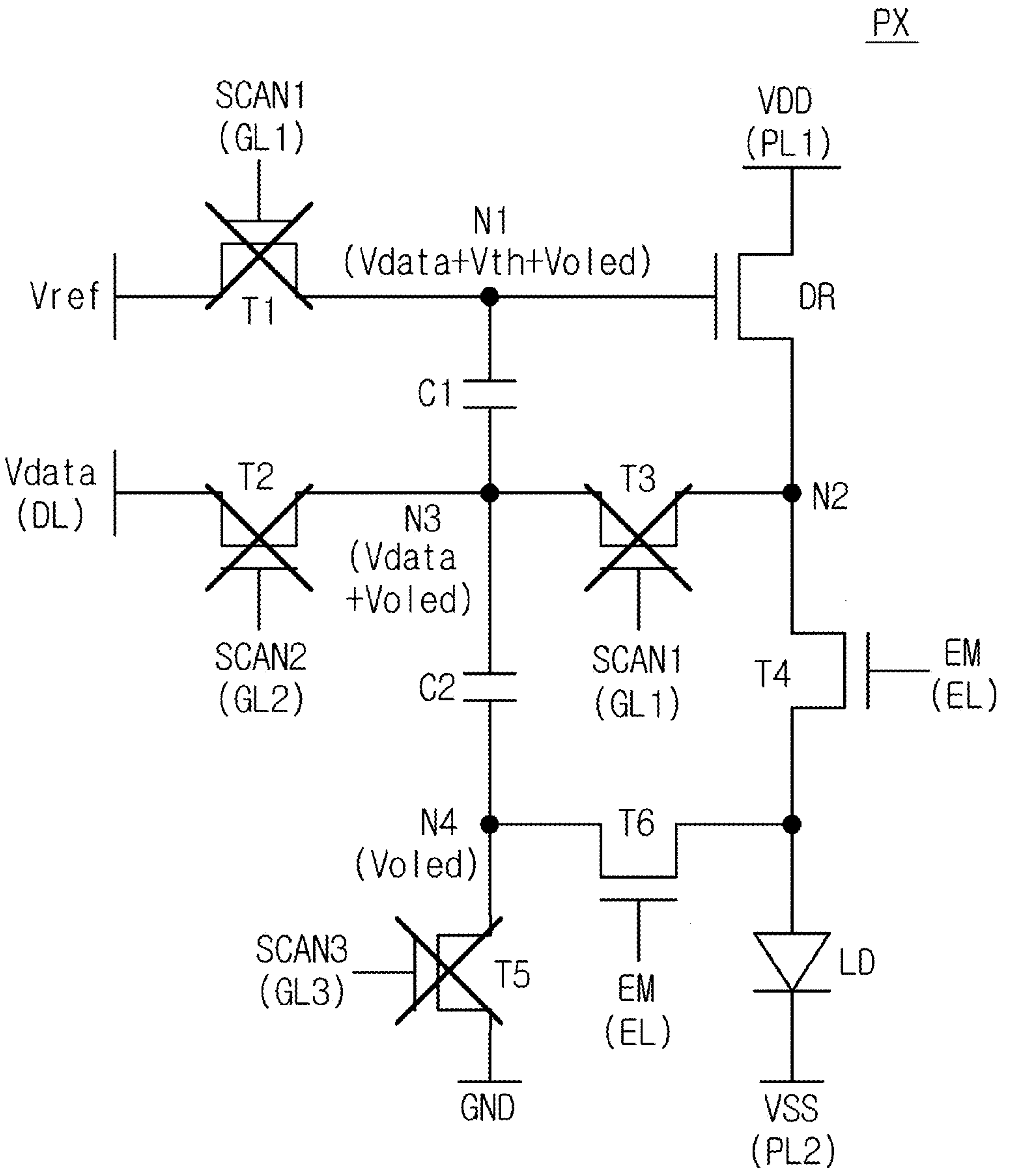

During the emission period t4, the light emitting element LD may emit light in response to the data voltage Vdata charged in the programming period t3. Referring to FIGS. 3 and 7 together, during the emission period t4, the emission signal EM is applied at the turn-on level. Therefore, the fourth transistor T4 and the sixth transistor T6 are turned on.

As the fourth transistor T4 is turned on, a current path in which a current flows from the high potential driving voltage VDD to the light emitting element LD via the driving transistor DR is formed. Therefore, a driving current Ioled corresponding to the gate-source voltage Vgs flows in the driving transistor DR.

Due to the driving current Ioled, a potential of the anode electrode of the light emitting element LD may increase to an operating point voltage Voled of the light emitting element LD to turn on the light emitting element LD. The turned-on light emitting element LD may emit light with a luminance corresponding to the driving current Ioled.

While the light emitting element LD emits light, the operating point voltage Voled of the light emitting element LD may be applied to the fourth node N4 through the sixth transistor T6. As the data voltage Vdata is charged in the second capacitor C2 during the previous period, the voltage at the third node N3 is set to the sum of voltages of the data voltage Vdata and the operating point voltage Voled of the light emitting element LD during the emission period t4. In addition, as the threshold voltage Vth of the driving transistor DR is charged in the first capacitor C1 during the previous period, the voltage at the first node N1 is set to the sum of voltages of the data voltage Vdata, the threshold voltage Vth of the driving transistor DR, and the operating point voltage Voled of the light emitting element LD during the emission period t4.

As a result, during the emission period t4, the gate-source voltage Vgs of the driving transistor DR is the sum of voltages of "(data voltage Vdata+threshold voltage Vth+operating point voltage Voled)−operating point voltage Voled)," that is, the sum of voltages of the data voltage Vdata and the threshold voltage Vth.

In this case, a drain-source current Ids of the driving transistor DR, that is, the driving current Ioled may be determined according to Equation 1 below.

$$Ids=0.5k(V\text{data}+Vth)^2=I\text{oled} \quad \text{Equation 1}$$

Here, k denotes a constant value determined by the mobility, channel ratio, parasitic capacitance, etc. of the driving transistor DR.

As described above, during the emission period t4, the driving current Ioled applied to the emission element LD includes a compensation value of the threshold voltage Vth of the driving transistor DR. Therefore, it is possible to compensate changes in characteristic values of the driving transistor DR due to the degradation of the pixel PX.

Meanwhile, during the emission period t4, the third transistor T3 is controlled to a turned-off state. Therefore, it is possible to prevent or at least reduce the voltage level variation of the third node N3 due to the voltage of the source electrode of the driving transistor DR, thereby stably maintaining the voltage of the gate electrode of the driving transistor DR and stably display images without any change in luminance during the emission period t4.

Describing the above-described driving method, while the pixel PX is driven, only the first transistor T1 is directly connected to the gate electrode of the driving transistor DR, and the third transistor T3 and the fourth transistor T4 are alternately connected to the source electrode of the driving transistor DR, and thus only one transistor is connected thereto. In general, when a transistor is switched, a voltage at the connected node may fluctuate, resulting in loss. In the pixel PX according to the present disclosure, it is possible to reduce the number of transistors connected to control each node voltage of the driving transistor DR, thereby reducing the voltage loss of the gate electrode and source electrode of the driving transistor DR.

In addition, the pixel PX according to the present disclosure is driven using one emission signal EM. That is, the pixel PX does not require a plurality of emission signals EM. Therefore, it is possible to reduce the number of lines required for the driver of the display device 1 and implement the narrow bezel.

According to the pixel, the method of driving the pixel, and the display device including the pixel according to the embodiments, it is possible to reduce the number of switching transistors connected to the driving transistor, thereby reducing the voltage loss at the gate node of the driving transistor due to switching.

In addition, according to the pixel, the method of driving the pixel, and the display device including the pixel according to the embodiments, it is possible to reduce the number of emission signals required for driving the pixel, thereby reducing the lines of the driver and implementing the narrow bezel.

In addition, according to the pixel, the method of driving the pixel, and the display device including the pixel according to the embodiments, it is possible to prevent the voltage variation of the driving transistor while the pixel emits light, thereby stably outputting the images without any change in luminance.

Although the embodiments of the present disclosure have been described above with reference to the accompanying drawings, those skilled in the art to which the present disclosure pertains will be able to understand that the above-described technical configuration of the present disclosure can be carried out in other specific forms without changing the technical spirit or essential features thereof. Therefore, it should be understood that the above-described embodiments are illustrative and not restrictive in all respects. In addition, the scope of the present disclosure is described by the claims to be described below rather than the detailed description. In addition, the meaning and scope of the claims and all changed or modified forms derived from the equivalent concept should be construed as being included in the scope of the present disclosure.

What is claimed is:

1. A pixel comprising:

a light emitting element;

a driving transistor having a first electrode connected to a high potential driving voltage, a second electrode electrically connected to the light emitting element at a second node, the driving transistor configured to control an amount of driving current supplied to the light emitting element in response to a voltage of a first node electrically connected to a gate electrode of the driving transistor;

a first transistor connected between a reference voltage line and the first node and configured to transmit a reference voltage to the gate electrode of the driving transistor in response to a first gate signal;

a second transistor connected between a data line and a third node and configured to transmit a data voltage to the gate electrode of the driving transistor in response to a second gate signal that is different from the first gate signal;

a third transistor electrically connecting the third node to the second node in response to the first gate signal; and a fourth transistor electrically connecting the second node with the light emitting element in response to an emission signal;

a first capacitor connected between the first node and the third node;

a second capacitor connected between the third node and a fourth node;

a fifth transistor connected to the second capacitor at the fourth node and a second power line that supplies a base voltage to the fifth transistor, the fifth transistor having a gate electrode that receives a third gate signal; and a sixth transistor connected to the second capacitor and the fifth transistor at the fourth node and the light emitting element and the fourth transistor, the sixth transistor having a gate electrode that receives the emission signal.

2. The pixel of claim 1, wherein the driving transistor comprising:

the gate electrode at the first node; and the first electrode that is connected a first power line that supplies the high potential driving voltage to the first electrode of the driving transistor.

3. The pixel of claim 2, wherein the first transistor is connected to the gate electrode of the driving transistor at the first node and the reference voltage line that supplies the reference voltage to the first transistor, the first transistor having a gate electrode that receives the first gate signal, wherein the second transistor is connected to the third transistor at the third node and to the data line that supplies the data voltage to the second transistor, the second transistor having a gate electrode that receives the second gate signal, wherein the third transistor is connected to the second transistor at the third node and the driving transistor at the second node, the third transistor having a gate electrode that receives the first gate signal.

4. The pixel of claim 1, wherein while the second transistor is in a turned-on state, the data voltage is transmitted to the gate electrode of the driving transistor via the first capacitor.

5. The pixel of claim 1, wherein while the second transistor is turned on or the light emitting element emits light, the third transistor is configured to electrically separate the second node from the third node by turning off.

6. The pixel of claim 1, wherein during an initialization period of one frame, the first gate signal, the emission signal, and the third gate signal are applied at turn-on levels, and the first node is initialized to the reference voltage through the first transistor that is turned on during the initialization period and the second node, the third node, and the fourth node are initialized to the base voltage through the third transistor, the fourth transistor, the fifth transistor, and the sixth transistor that are turned on during the initialization period.

7. The pixel of claim 1, wherein during a sensing period of one frame while the first gate signal and the third gate signal are applied at turn-on levels, the gate electrode and the second electrode of the driving transistor are electrically connected to each other by the first capacitor and the third transistor that is turned on during the sensing period and a voltage corresponding to a voltage difference between the reference voltage and a threshold voltage of the driving transistor is stored in the second capacitor.

8. The pixel of claim 1, wherein during a programming period of one frame, the second gate signal and the third gate signal are applied at turn-on levels and the third node is set to the data voltage through the second transistor that is turned on during the programming period, the fourth node is set to the base voltage through the fifth transistor that is turned on during the programming period, the data voltage is stored in the second capacitor, and a sum of voltages of the data voltage and a threshold voltage of the driving transistor is stored in the first capacitor.

9. The pixel of claim 1, wherein during an emission period of one frame, the emission signal is applied at a turn-on level and a driving current is applied to the light emitting element through the fourth transistor that is turned on during the emission period and the light emitting element emits light in response to the driving current.

10. A display device comprising:

a display panel including a plurality of pixels, the plurality of pixels comprising the pixel of claim 1;

a gate driver configured to apply the first gate signal, the second gate signal, and the third gate signal to the plurality of pixels;

an emission driver configured to apply the emission signal to the plurality of pixels;

a data driver configured to output the data voltage to the plurality of pixels; and a timing controller configured to control operation timings of the gate driver, the emission driver, and the data driver.

11. A method of driving a pixel including a light emitting element, a driving transistor having a gate electrode at a first node, a first electrode connected to a high potential driving voltage line that supplies a high potential driving voltage to the first electrode, and a second electrode connected to a second node, a first transistor connected to the gate electrode of the driving transistor at the first node and a reference voltage line that supplies a reference voltage to the first transistor and the first transistor having a gate electrode receiving a first gate signal, a second transistor connected to a data line that supplies a data voltage to the second transistor and a third node and having a gate electrode receiving a second gate signal, a third transistor connected between the third node and the second node and having a gate electrode receiving the first gate signal, a fourth transistor connected between the third node and the light emitting element and having a gate electrode receiving an emission signal, and a first capacitor connected between the first node and the third node, a second capacitor connected between the third node and a fourth node, a fifth transistor connected to the second capacitor at the fourth node and a second power line that supplies a base voltage, the fifth transistor having a gate electrode that receives a third gate signal and a sixth transistor connected to the second capacitor and the fifth transistor at the fourth node and the light emitting element and the fourth transistor, the sixth transistor having a gate electrode that receives the emission signal, the method comprising:

applying the first gate signal and the emission signal at turn-on levels during an initializing period, the first transistor and the third transistor turned on during the initializing period responsive to the first gate signal and the fourth transistor turned on during the initializing period responsive to the emission signal;

applying the first gate signal at a turn-on level during a sensing period that is after the initializing period, the first transistor and the third transistor turning on during the sensing period responsive to the first gate signal;

applying the second gate signal and the third gate signal at turn-on levels and the emission signal at a turn-off level during a programming period that is after the sensing period, and the third node is set to the data voltage through the second transistor that is turned on during the programming period responsive to the second gate signal, the fourth node is set to the base voltage through the fifth transistor that is turned on during the programming period responsive to the third gate signal, the sixth transistor is turned off during the programming period responsive to the emission signal, and the data voltage is stored in the second capacitor and a sum of voltages of the data voltage and a threshold voltage of the driving transistor is stored in the first capacitor; and applying the emission signal at a turn-on level during an emission period that is after the programming period, the fourth transistor turned on during the emission period responsive to the emission signal.

12. The method of claim 11, wherein during the initializing period the third gate signal is further applied at a turn-on level and the fifth transistor is turned on responsive to the third gate signal during the initializing period.

13. The method of claim 12, wherein during the programming period, the data voltage applied to the data line is transmitted to the gate electrode of the driving transistor via the first capacitor.

14. The method of claim 12, wherein during the programming period and the emission period, the second node and the third node are electrically separated from each other by turning off the third transistor.

15. A pixel comprising:

a light emitting element;

a driving transistor including a first electrode connected to a high potential voltage line that supplies a high potential driving voltage to the driving transistor, a second electrode connected to a second node, and a gate electrode connected to a first node;

a first transistor including a first electrode connected to a reference line that supplies a reference voltage to the first transistor, a second electrode connected to the gate electrode of the driving transistor at the first node, and a gate electrode that receives a first gate signal;

a second transistor including a first electrode connected to a data line that supplies a data voltage to the second transistor, a second electrode connected to a third node, and a gate electrode that receives a second gate signal that is different from the first gate signal;

a third transistor including a first electrode connected to the second electrode of the second transistor at the third node, a second electrode connected to the second electrode of the driving transistor at the second node, and a gate electrode that receives the first gate signal;

a fourth transistor including a first electrode connected to the second electrode of the driving transistor and the second electrode of the third transistor at the second node, a second electrode connected to the light emitting element, and a gate electrode that receives an emission signal;

a first capacitor including a first capacitor electrode connected to the second electrode of the first transistor and the gate electrode of the driving transistor at the first node and a second capacitor electrode connected to the second electrode of the second transistor and the first electrode of the third transistor at the third node;

a second capacitor including a first capacitor electrode connected to the second electrode of the second transistor, the second capacitor electrode of the first capacitor, and the first electrode of the third transistor at the third node and a second capacitor electrode connected to a fourth node;

a fifth transistor including a first electrode connected to the second capacitor electrode of the second capacitor at the fourth node, a second electrode connected to a second power line that supplies a base voltage to the fifth transistor, and a gate electrode that receives a third gate signal; and a sixth transistor including a first electrode connected to the second capacitor electrode of the second capacitor and the first electrode of the fifth transistor at the fourth node, a second electrode connected to the second electrode of the fourth transistor and the light emitting element, and a gate electrode that receives the emission signal.

16. The pixel of claim 15, wherein during an initialization period of one frame, the first gate signal, the emission signal, and the third gate signal are applied at turn-on levels and the first node is initialized to the reference voltage through the first transistor that is turned on during the initialization period and the second node, the third node, and the fourth node are initialized to the base voltage through the third transistor, the fourth transistor, the fifth transistor, and the sixth transistor that are turned on during the initialization period.

17. The pixel of claim 16, wherein during a sensing period that is after the initialization period of the one frame, while the first gate signal and the third gate signal are applied at turn-on levels that turn on the first transistor, the third transistor, and the fifth transistor during the sensing period, the gate electrode and the second electrode of the driving transistor are electrically connected by the third transistor and the first capacitor and a voltage corresponding to a voltage difference between the reference voltage and a threshold voltage of the driving transistor is stored in the second capacitor, wherein the second transistor, the fourth transistor, and the sixth transistor are turned off during the sensing period.

18. The pixel of claim 17, wherein during a programming period of the one frame that is after the sensing period, the second gate signal and the third gate signal are applied at turn-on levels and the second transistor and the fifth transistor are turned on during the programming period, and the third node is set to the data voltage by the second transistor, the fourth node is set to the base voltage by the fifth transistor, the data voltage is stored in the second capacitor, and a sum of voltages of the data voltage and the threshold voltage of the driving transistor is stored in the first capacitor, wherein the third transistor, the fourth transistor, and the sixth transistor are turned off during the programming period.

19. The pixel of claim 18, wherein while the second transistor is turned on during the programming period, the data voltage is transmitted to the gate electrode of the driving transistor via the first capacitor.

20. The pixel of claim 18, wherein, during an emission period of the one frame, the emission signal is applied at a turn-on level and the fourth transistor and the sixth transistor are turned on during the emission period, and a driving current is applied to the light emitting element through the fourth transistor and the light emitting element emits light in response to the driving current, wherein the first transistor, the second transistor, the third transistor, and the fifth transistor are turned off during the emission period.

21. The pixel of claim 20, wherein while the second transistor is turned on during the programming period or the light emitting element emits light during the emission period, the third transistor is configured to separate the second node and the third node by turning off.

* * * * *